United States Patent [19]
Cole

[11] 3,887,104
[45] June 3, 1975

[54] SEALED GAS TANK
[76] Inventor: David F. Cole, 99 Elmridge Rd., Mansfield, Ohio 44907
[22] Filed: Oct. 7, 1970
[21] Appl. No.: 78,786

[52] U.S. Cl. .......................... 220/85 B; 220/85 VS
[51] Int. Cl. .............................................. B65d 87/16
[58] Field of Search ........ 220/85 B, 85 VR, 85 VS, 220/86 R

[56] References Cited
UNITED STATES PATENTS

| | | | |
|---|---|---|---|
| 1,652,793 | 12/1927 | Perry | 220/85 B UX |
| 3,003,659 | 10/1961 | Miller | 220/85 B |
| 3,477,611 | 11/1969 | Niles | 220/86 R |

FOREIGN PATENTS OR APPLICATIONS

| | | | |
|---|---|---|---|
| 47,829 | 7/1937 | France | 220/85 B |

Primary Examiner—George E. Lowrance
Attorney, Agent, or Firm—Donnelly, Maky, Renner & Otto

[57] ABSTRACT

A sealed gas tank comprising a flexible container which opens up and collapses as the amount of liquid contained therein is increased and decreased, and a collapsible expansion chamber associated with the flexible container which may be collapsed by a spring during filling of the tank. Afterwards, the spring is released to provide additional space in the expansion chamber for expansion of the liquid when the tank is full.

3 Claims, 3 Drawing Figures

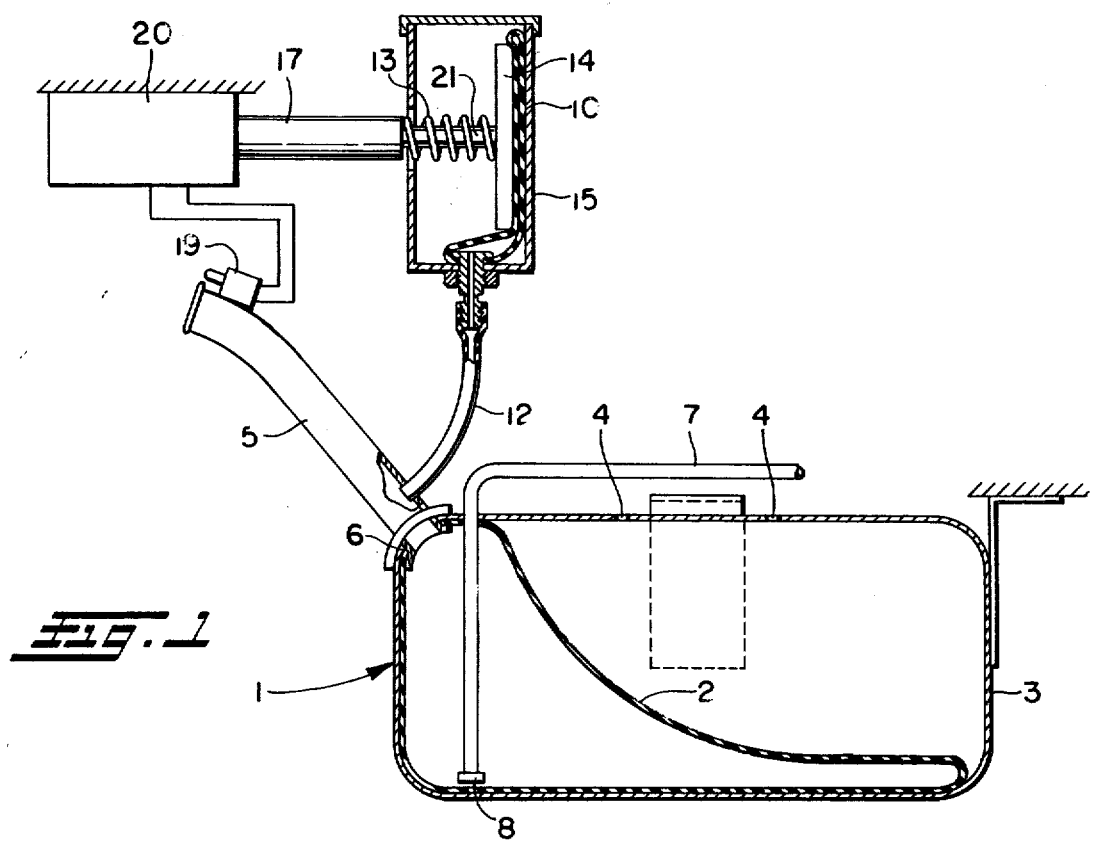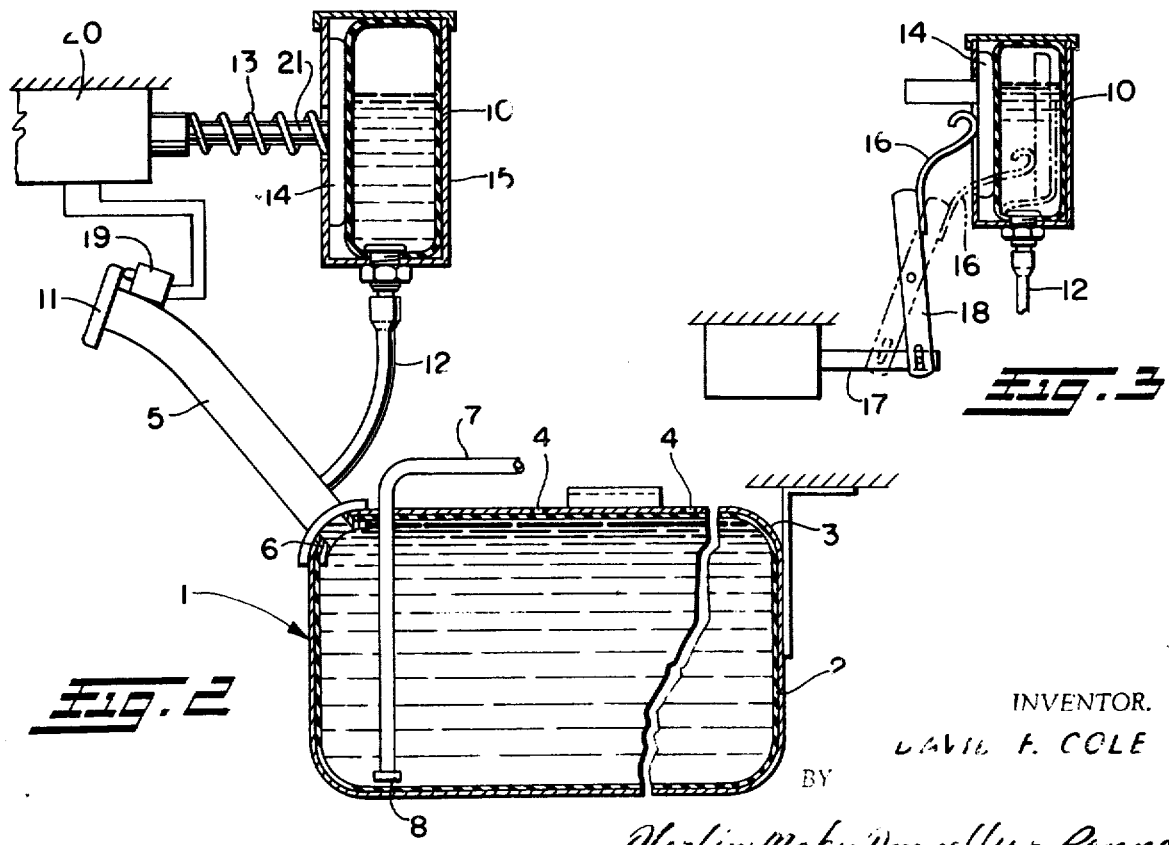

SEALED GAS TANK

BACKGROUND OF THE INVENTION

This invention relates generally as indicated to a sealed gas tank particularly for use in automobiles and other vehicles.

Conventional gasoline tanks are usually made of metal and require venting to prevent the formation of a vacuum during withdrawal of gas therefrom and also prevent a build-up in vapor pressure within the tank when full. Thus, while venting is necessary, it is undesirable both because of the pollution and fire hazard caused by the gas vapors escaping into the air and the spilling of gasoline which occurs due to expansion and splashing of the gasoline within the tank when full. In addition, metal tanks are objectionable because they are susceptible to corrosion, particularly in the winter if not kept full due to the water vapor which condenses and collects within the tank.

SUMMARY OF THE INVENTION

It is accordingly a principal object of this invention to provide a sealed gas tank to prevent the escape of gas vapors from the tank and prevent the tank from spilling over even when full.

Another object is to make the tank collapsible so that its size varies with the amount of gasoline in the tank, thereby eliminating the need for having to vent the tank and reducing the amount of splash within the tank and the attendant noise caused thereby.

Still another object is to provide a tank with a collapsible expansion chamber to accommodate excessive gas vapors and expansion of the liquid.

Still another object is to provide such a tank which will withstand the deteriorating action of the liquids contained therein for a long, maintenance-free life.

These and other objects of the present invention may be achieved by using a flexible container for the gas tank which opens up and collapses as the amount of liquid contained therein is increased and decreased, thereby permitting the tank to be sealed. A collapsible expansion chamber provides additional space for expansion of the liquid and prevents escessive build-up of vapor pressure within the tank when full. The expansion chamber may be collapsed by springs or the like during filling of the tank to prevent vapor and air from becoming trapped in the expansion chamber. After the tank is filled and sealed, the spring force is released to permit the liquid to expand into the expansion chamber as its temperature increases.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

BRIEF DESCRIPTION OF THE DRAWING

In the annexed drawing:

FIGS. 1 and 2 are schematic illustrations of a preferred form of sealed tank constructed in accordance with the present invention, FIG. 1 showing the tank empty and FIG. 2 showing the tank full; and FIG. 3 is a schematic illustration of a modified form of expansion chamber for the sealed tank.

DESCRIPTION OF THE PREFERRED EMBODIMENTS

Referring first to FIGS. 1 and 2, there is shown a preferred form of sealed gas tank 1 in accordance with this invention including an unvented flexible container 2 desirably made of a suitable rubber or plastic material which is resistant to attack by gasoline and other liquids for which the tank is designed. Surrounding the flexible container 2 is an outer metal shell 3 which may be used to support the container on a vehicle, and such shell 3 also provides protection for the flexible container 2 from rupture or damage by preventing external objects from contacting the container. Vent holes 4 may be provided in the outer shell 3 as shown to prevent entrapment of air between the outer shell and flexible container.

For filling the container with fuel or other volatile liquid, there is provided a fill pipe 5 which extends upwardly from the container 2 through an opening 6 in the outer shell 3. Effective support for the fill pipe 5 may be obtained by securing the container 2 to the outer shell 3 in the region of the fill pipe 5 as by using a suitable adhesive, and the fill pipe 5 may also be clamped directly to the outer shell 3 as shown for increased support.

Removal of the liquid from within the tank is obtained through a gas line 7 which also desirably communicates with the container 2 in the region where the container is adhered to the outer shell 3 to provide a fixed mount for the gas line. The gas line 7 extends downwardly into the container 2 closely adjacent the bottom so that the container may be substantially completely emptied, and a strainer 8 is desirably attached to the intake end of the gas line to prevent contaminants from entering the gas line with the fuel.

Except for the connection between the flexible container 2 and outer shell 3 where the fill pipe 5 and gas line 7 communicate with the flexible container, the container is free to expand and collapse within the outer shell, whereby venting of the container is not required. During filling the container opens up as shown in FIG. 2 to accommodate the additional liquid, whereas during withdrawal of the liquid the container reduces in size as shown in FIG. 1 to prevent a vacuum from forming within the container. An expansion chamber 10 is also connected to the flexible container 2 which provides room for expansion of the liquid when heated after filling of the tank to accommodate vapor pressure and overflow liquid without venting. A seal cap 11 is used to tightly seal the fill pipe 5 after filling the container to the desired level (see FIG. 2).

The expansion chamber 10 is made of a suitable flexible material such as a rubber or plastic that will resist deterioration by the liquid, and is suitably supported above the container 2 and fill pipe 5 to prevent liquid from entering the expansion chamber 10 during normal filling of the tank. A flexible tube 12 extending from the bottom of the expansion chamber 10 to the lower end of the fill pipe 5 provides the required communication between the expansion chamber and flexible container.

Suitable means are also provided to collapse the expansion chamber 10 during filling of the tank to prevent entrapment of air and gas vapors within the expansion chamber. In FIG. 1, a compression spring 13 is used for that purpose and presses a movable plate 14 against one side of the expansion chamber 10 forcing the expansion chamber against a stationary support 15 for collapsing the expansion chamber, whereas in FIG. 3 a leaf spring 16 is used for the same purpose.

After the flexible container 2 has been filled and the seal cap 11 has been replaced on the outer end of the fill pipe 5, the spring force against the expansion chamber 10 may either be released to provide additional space therein for expansion of the liquid during heating thereof, or the spring force may be made sufficiently light that the expansion of the liquid will automatically overcome the force of the spring.

If the spring force is to be released, this may be accomplished in any convenient manner, as by providing a solenoid actuated plunger 17 which acts directly on the compression spring 13 as shown in FIG. 1 or acts on a pivotally mounted support 18 for the leaf spring 16 as shown in FIG. 3. A switch 19 for the solenoid 20 may be located adjacent the outer end of the fill pipe 5 as shown in FIGS. 1 and 2, whereby when the cap 11 is removed, the solenoid 20 is energized to compress the spring 13 or 16, and when the cap 11 is replaced, the solenoid 20 is deenergized to release the spring. When a compression spring 13 is used, a guide rod 21 telescopically received in the outer end of the solenoid plunger 17 may be used to provide the necessary support for the spring and movable plate 14.

From the foregoing, it will now be apparent that the sealed tank of the present invention permits complete sealing of the tank after filling to eliminate pollution of the air by the escape of gas vapors and overflow of liquid without in any way affecting the operation of the tank. Formation of a vacuum within the tank during withdrawal of liquid therefrom cannot occur because the tank is collapsible, and expansion of the liquid within the tank when full is accommodated for by the collapsible expansion chamber which communicates with the flexible container.

I, therefore, particularly point out and distinctly claim as my invention:

1. A sealed tank for gas and other volatile liquids comprising a flexible container which expands and collapses during liquid filling and removal to accommodate the liquid contained therein, a fill pipe connected to said container through which said container is filled, a cap for sealing said fill pipe, a liquid discharge line connected to said container, a collapsible expansion chamber connected to said container providing additional space for expansion of the liquid within said container, and spring means pressing against said expansion chamber for collapsing said expansion chamber during filling of said container to prevent entrapment of air and gas vapors in said expansion chamber.

2. The tank of claim 1 further comprising means for releasing the spring after filling of said container and sealing of said fill pipe by said cap.

3. A sealed tank for gas and other volatile liquids comprising an unvented flexible container which expands and collapses during liquid filling and removal to accommodate the liquid contained therein, a fill pipe connected to said container through which said container is filled, a cap for sealing said fill pipe, a liquid discharge line connected to said container, a collapsible expansion chamber connected to said container providing additional space for expansion of the liquid within said container, and releasable means for collapsing said expansion chamber during filling of said container to prevent entrapment of air and gas vapors in said expansion chamber.

* * * * *